United States Patent [19]

Fridrich et al.

[11] Patent Number: 5,297,143
[45] Date of Patent: Mar. 22, 1994

[54] NETWORK COMMUNICATION PROTOCOL INCLUDING A RELIABLE MULTICASTING TECHNIQUE

[75] Inventors: Marek J. Fridrich, San Jose; Glen M. Riley, Los Gatos; Robert A. Dolin, Jr., Menlo Park, all of Calif.

[73] Assignee: Echelon Systems, Corp., Palo Alto, Calif.

[21] Appl. No.: 621,739

[22] Filed: Dec. 3, 1990

[51] Int. Cl.[5] .................................................. H04J 3/02
[52] U.S. Cl. ....................................... 370/85.3; 371/32
[58] Field of Search ...................... 370/85.3, 13, 110.1, 370/77, 51, 52, 67, 85.1, 94.1, 76; 455/57; 340/825.47; 371/32, 33

[56] References Cited

U.S. PATENT DOCUMENTS

| | | | |
|---|---|---|---|
| 4,063,220 | 12/1977 | Metcalfe et al. | 340/147 LP |
| 4,332,027 | 5/1982 | Malcolm et al. | 370/94 |
| 4,426,697 | 1/1984 | Petersen et al. | 370/85 |
| 4,523,299 | 6/1985 | Donohue et al. | 364/900 |
| 4,623,886 | 11/1986 | Livingston | 370/85.6 |
| 4,630,264 | 12/1986 | Wah et al. | 370/85.3 |
| 4,692,918 | 9/1987 | Elliot et al. | 370/94.1 |
| 4,809,268 | 2/1989 | Tejima et al. | 370/13 |
| 4,823,123 | 4/1989 | Siwiak | 340/825.47 |
| 4,875,038 | 10/1989 | Siwiak et al. | 340/825.47 |
| 4,882,579 | 11/1989 | Siwiak | 340/825.47 |
| 4,891,637 | 1/1990 | Siwiak et al. | 340/825.47 |
| 4,918,690 | 4/1990 | Markkula, Jr. et al. | 370/94 |
| 4,947,162 | 8/1990 | Kimura | 340/825.080 |
| 4,979,168 | 12/1990 | Courtois et al. | 370/94.1 |
| 5,029,209 | 7/1991 | Strong, Jr. et al. | 380/25 |
| 5,036,518 | 7/1991 | Tseung | 370/94.3 |
| 5,038,346 | 8/1991 | Courtois | 370/85.6 |
| 5,042,083 | 8/1991 | Ichikawa | 455/57 |
| 5,053,883 | 10/1991 | Johnson | 358/349 |

OTHER PUBLICATIONS

Chang, S. S. L., 1982 Fundamentals Handbook of Electrical and Computer Engineering, vol. II, Communication, Control Devices and Systems. John Wiley & Sons, N.Y., pp. 617-627.

Waters, A. G., "The Use of Broadcast and Multicast Techniques on Computer Networks", Conference on Electronic Delivery of Data and Software, IERE Publication No. 69, pp. 45-50 (Sep. 1986).

Chang, G. M. and Maxemchuk, N. F., "Reliable Broadcast Protocols", ACM Transactions on Computer Systems, vol. 2, No. 3, pp. 251-273 (Aug. 1984).

Cheriton, D. R. and Zwaenepol, W., "Distributed Process Groups in the V Kernel", ACM Transactions on Computer Systems, vol. 3, No, 2. pp. 77-107 (May 1985).

Yoshida, I., Kishida, H., and Yamazaki, H., "Banet-A Local Area Network for Distributed Data Processing", Computer Communications, vol. 7, No., 1, pp. 3-11, (Feb. 1984).

Primary Examiner—Douglas W. Olms
Assistant Examiner—Shick Hom
Attorney, Agent, or Firm—Blakely, Sokoloff, Taylor & Zafman

[57] ABSTRACT

An improved network for communication of message packets. The present invention provides for improved reliable multicast messaging wherein messages may be reliably multicast to members of a multicast group and acknowledgements may be handled in an improved and efficient manner. In particular, a message may be transmitted to all members of a group, each member of the group responding to receipt of the message with an acknowledgement message. Further, facility is provided to allow for transmissions of reminder messages in the event one or members of a group do not respond to a message with an acknowledgement.

8 Claims, 11 Drawing Sheets

| Type: (MSG or uMSG) 1001 | Trans_No 1002 | Message 1003 |

| Type: (Reminder 1) 1001 | Trans_No 1002 | Member List 1005 |

NETWORK COMMUNICATION PROTOCOL INCLUDING A RELIABLE MULTICASTING TECHNIQUE

BACKGROUND OF THE INVENTION

1. FIELD OF THE INVENTION

The present invention relates to a network protocol which may be employed to facilitate communication between processing nodes such as nodes responsible for control of and communication with devices.

2. PRIOR ART

Any number of network communication protocols are known in the art. A number of protocols have become "standards" in the industry either because of adoption by the various standards boards such as the American National Standards Institute (ANSI) or because of their commercial acceptance or both. Other communication protocols are proprietary in nature although in many instances such protocols have gained widespread commercial acceptance. Examples of known network communication protocols include Recommendation X.xx from the International Consultative Committee for Telephony and Telegraphy (CCITT) (e.g. X.21, X.25, etc.); High Level Data Link Control (HDLC); EHKP4; IBM's Systems Network Architecture (SNA); DEC's Distributed Network Architecture (DECNET); Univac's Distributed Communication Architecture (DCA); and Burroughs Network Architecture. The above-referenced protocols are described in greater detail with reference to Anton Meijer and Paul Peters, *Computer Network Architectures*, Computer Science Press, 1982.

Many of these communication protocols may be characterized as following the Reference Model of Open Systems Interconnection, defined by the International Standards Organization (ISO) and described in greater detail with reference International Standards Organization, ISO/TC97: *Information processing system. Open Systems Interconnection-Basic Reference Model*, Draft International Standard ICO/DIS 7498, April 1982 which reference is reproduced as Appendix A in Meijer.

The Reference Model defines a layered approach to communication architectures; specifically seven (7) layers are defined and may be identified, with reference to Table I, as follows:

TABLE I

| Level # | Layer |
| --- | --- |
| 7 | Application Layer |
| 6 | Presentation Layer |
| 5 | Session Layer |
| 4 | Transport Layer |
| 3 | Network Layer |
| 2 | Data Link Layer |
| 1 | Physical Layer |

The Application layer may be generally described as being responsible for processing information being exchanged between nodes in the network. The Presentation layer provides transparency between nodes in the network allowing for such functions as performing session establishment requests; presentation of data from a message packet; code conversion; compression/expansion of redundant data; and performing session termination requests. The Session layer provides for establishment of the relation between two nodes; maintains the integrity of the relation; and controls data exchange between the two nodes. The Transport layer is responsible for creation of a transport pipeline between the two nodes and performs the functions of breaking messages into packets; reassembling messages at the destination node; and applying flow control to the packet stream. The Network layer is responsible for creation and maintenance of a route in the network between the source node and destination node. The route may be a sequence of nodes and transmission links, e.g., telephone lines, communication cabling, etc. The Data Link layer ensures uncorrupted delivery of the data independent of the actual physical transmission medium utilized. Finally, the Physical layer comprises the actual physical devices and medium necessary to perform transmission of information.

More recently, standards and protocols have been produced for communication in local area networks (LANs). In addition to the above-described layers, many LANs include a sublayer known as the Medium Access Control (MAC) sublayer which is responsible for determining which node is allowed access to a channel when there is competition for the channel. The MAC sublayer is typically thought of as being the upper portion of the Physical layer (Layer 1) and is sometimes referred to as Layer 1.5. One set of standards dealing with communication protocols for LANs has been defined by the IEEE known collectively as IEEE 802. This set of standards has been adopted by ANSI, by the National Bureau of Standards, and by ISO (known as ISO 8802). Part 802.3 of the IEEE standard describes Carrier Sense Multiple Access with Collision Detection (CSMA/CD) protocols for LANs. This Part 802.3 is described in greater detail with reference to Andrew S. Tanenbaum, *Computer Networks*, Second Edition, Prentice-Hall, Inc., 1988.

In addition to describing the Part 802.3 standard, Tanenbaum describes several CSMA protocols. In any CSMA protocol it is an objective to allow for minimizing delays before transmission of information onto a channel and to allow for minimizing collisions of data on the channel. Various protocols are known and in each case there is a tradeoff between minimizing delays and minimizing collisions. Below, in Table II, is summarized several protocols and their various performance tradeoffs:

TABLE II

| Protocol | Description |
| --- | --- |
| Pure ALOHA | Allows for unsynchronized transmission at any time by any node; leads to low delays and a high collision rate. |
| Slotted ALOHA | Random transmission within defined timeslots; reduces the period of time during which a transmission is vulnerable to collision over Pure ALOHA; |
| 1-persistent CSMA | Senses whether there is activity on a channel and waits to transmit until the channel is available; continuously monitors the channel after sensing the channel is busy yielding a probability of 1 (thus, the name 1-persistent) that the node will transmit when the channel is idled. Collisions are possible (even likely) because two nodes may be waiting for a channel at the same time. |
| p-persistent CSMA | A variation on 1-persistent in which the probability any given node will transmit when the channel becomes available is p. This protocol reduces the likelihood of collisions over a 1-persistent scheme; however, there is also an increase in the average delay before transmission. |
| non-persistent CSMA | Unlike 1-persistent and p-persistent CSMA, non-persistent CSMA does not continuously sense the channel after detecting the channel is busy |

TABLE II-continued

| Protocol | Description |
|----------|-------------|
|  | but rather waits a random period of time after sensing the channel is busy before again testing it. This protocol leads to a lower collision rate than 1-persistent CSMA but also leads to longer delays. |

Further explanation of the above-mentioned protocols are given with reference to Tanenbaum.

As can be imagined, various characteristics of any given communications network influence design decisions regarding the above-described tradeoffs. For example, in a system in which the average length of a message is relatively long, it may be desirable to minimize the collision rate in order to minimize the need to re-transmit information. Conversely, in a system characterized by relatively short message lengths, it may be desirable to minimize delays at the expense of increasing collisions.

As one object of the present invention, it is desired to describe a system having improved optimization of delay time and collision rate.

As a second object of the present invention, it is desired to describe a system having improved capability for recovery and backoff from collisions on a network medium.

As a third object of the present invention, it is desired to describe a system having an improved prioritization scheme for prioritizing network messages.

In networked systems, it is often desirable to allow one node in the network to multicast a message for receipt by a plurality of other nodes. In certain cases, it may be of relatively insignificant consequence whether the transmitted messages are actually received by all of the desired nodes. In other cases, it may be critical to operation of the network that transmitted messages are received by each intended recipient node.

In certain prior art networked messaging systems, it is known to provide for delivery of a message to a designated group of nodes. However, known prior art networked messaging systems suffer difficulty in managing acknowledgements from multiple nodes in a group. This leads to difficulty in providing for reliable multicast of messages.

As another object of the present invention, it is desired to describe a networked messaging system which provides for reliable multicast of messages.

It is another object of the present invention to describe methods for providing reliable multicast of messages through use of reminder messages and acknowledgement messages.

It is another object of the present invention to describe a networked messaging system which provides for reliable multicast of messages with improved efficiency in the acknowledgement of messages by members of a multicast group.

As will be appreciated by any individual who has configured a network, one difficulty often encountered during configuration of the network involves correctly and accurately assigning and recording the addresses for each node. Further, during maintenance of a highly distributed system, it is often desirable to provide accessibility to identification information identifying a particular node in the network.

It is desired to develop an improved apparatus and method for configuring and maintaining nodes in a network.

These and other aspects of the present invention are disclosed with reference to the Detailed Description of the Preferred Embodiment and to the Figures.

SUMMARY OF THE INVENTION

The present invention discloses a method for avoiding data collisions in a network medium which connects a plurality of devices in a network. A device prepares a first message packet for transmission on the medium. The first device senses the medium to determine if the medium is idle and, at some point in time, determines the medium is idle. Subsequent to determining the medium is idle, the device computes a time period P using a formula F where the formula F includes as a factor a uniformly distributed pseudo-random delay factor T. The first device continues to monitor the medium during the time period P and transmits the message onto the medium if the medium remains idle during the time period P.

The present invention further provides calculation of the pseudo-random delay factor T includes a backlog factor BL representative of the estimated backlog of the network.

Still further, the present invention discloses methods of prioritizing access to the medium such that priority messages are allowed access to the medium without contention during a first portion of a randomizing window and non-priority messages are allowed access to the medium with contention during the second portion of the randomizing window.

It might be noted that the backlog of the network is estimated by methods of the present invention through use of a backlog counter BL. The backlog counter BL is initialized to an initialization value. The backlog counter is decremented during each packet cycle. A packet cycle may be defined as the length of time to send the average packet plus the average interpacket delay time. Thus, the backlog counter is decremented as a function of time rather than as a function of receiving packets. Therefore, even in the absence of message traffic on the media, the backlog counter will, overtime, be decremented to its minimum value.

The backlog counter is incremented based on information received by the node (e.g., in the preferred embodiment, each message sent on the medium indicates the number of messages expected to be transmitted as a result of the message). In the preferred embodiment this load information is estimated by the sending node and transmitted as part of the header of each message sent on the medium.

In the system of the preferred embodiment, at least one acknowledgement message is expected to be generated responsive to the majority of "original" messages generated. In fact, some percentage of the original messages can be expected to cause multiple acknowledgement messages to be generated because of the use of reliable multicast messaging in the system of the preferred embodiment. The present invention takes advantage of the expected high percentage of message traffic being acknowledgements in order to provide for estimation of channel backlog.

There are several ways in which the estimated backlog may vary from the actual backlog. For example, as just stated in the present invention backlog estimation is based on the assumption that a relatively large portion of the message traffic on the network is acknowledgement traffic. Original messages are not included in the backlog estimation and, therefore, if there is a significant number of "original" messages transmitted on the network, the estimated backlog may be significantly lower than the actual backlog. Second, because the present invention provides for decaying the estimated backlog as a function of time, if there is a significant delay in transmitting an acknowledgement message, the backlog couner may be decremented as a result of the passage of time, resulting in the backlog counter reflecting a lower backlog than the actual backlog of the system. Third, in certain cases, a node may not respond to a message. For example, the node may be out of service or offline (in the preferred embodiment a node which is "offline" will continue to respond to certain classes of messages). In the case of a node not responding, the backlog counter reflects a higher value than the actual backlog because a message will never be transmitted by the non-responding node.

Recognizing the estimated backlog may, in time, vary from the actual backlog, the present invention further provides methods for periodically adjusting the estimated backlog based on feedback from the network. In the preferred embodiment, a first mechanism for adjusting the estimated backlog by allowing decay of the estimated backlog as a function of time. A second mechanism provides for adjusting the estimated backlog as a function of packet spacing on the network.

Utilizing the methods of the present invention, improved channel utilization is achieved in networks such as the network of the present invention. It is noted that the methods of the present invention represent an improvement over, for example, known p-persistent CSMA techniques in that the probability of a particular node transmitting (the "p" of p-persistent) varies in the present invention with network traffic, allowing for minimized transmission delay.

The present invention further provides for reliable multicast of messages in the network. Utilizing characteristics of the network of the present invention, the present invention is able to overcome prior art difficulties with handling of a large number of acknowledgments which may be generated to support such reliable multicast techniques.

In the event a message sent by a sender node is not acknowledged by one or more of the intended recipients of the message, the sender node transmits a reminder message. The reminder message is preferably transmitted to all of the intended recipients with indication in the reminder message format as to which acknowledgements were received by the sender.

Finally, the present invention discloses means and methods for allowing configuration and management of the nodes in the network in the form of a controller device for communicating with nodes in the network. The controller device may be coupled for providing communication with a node and may receive and display information, such as configuration and address information received from the node. Further, the controller device may transmit configuration and addressing information to the node. Each node preferably comprises a sensing means for sensing a connection has been made with the node. Responsive to sensing a connection has been made, address information is transmitted. The sensing means is preferably in the form of a service pin. Finally, the node includes an indication means in the form of a light emitting diode (LED) for indicating the state (configured and operating normally, error condition, or unconfigured) of the node.

These and other aspects of the present invention will be apparent to one of ordinary skill in the art with further reference to the below Detailed Description of the Preferred Embodiment and the accompanying drawings.

BRIEF DESCRIPTION OF THE DRAWINGS

FIGS. 10A through 10D illustrate formats for communication of messages, acknowledgements, and reminders during communication between nodes in the present invention.

DETAILED DESCRIPTION OF THE PREFERRED EMBODIMENT

An improved computer network is described. In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

OVERVIEW OF THE NETWORK OF THE PRESENT INVENTION

The network of the present invention is of the type which provides for sensing, control and communication. The network of the present invention and cells utilized within the network of the present invention are described in greater detail with reference to U.S. Pat. No. 4,918,690 Markkula et al. titled "Network and intelligent cell for providing sensing, bi-directional communications and control", which patent is assigned to the assignee of the present invention (referred to herein as the '690 patent).

In an exemplary network, the network of the present invention may provide for sensing of current environmental factors and control of apparatus affecting the environmental factors. Further, the network may allow for communication of information packets providing information on the environmental factors between nodes in the network. The present application will utilize, as an example, a network for control of furnace valves based on sensing and communicating information regarding temperature in different zones in a controlled environment.

It might be worthwhile noting that in an expected scenario, various manufacturers will include a node of the type defined by the present invention in their products. For example, a thermostat manufacturer may include such a node in its thermostats. A valve manufacturer may include such a node in its valves. A control circuit manufacturer may include such a node in its control circuit. The various nodes may be programmed for specific applications by their respective manufacturers and, when configured in an environmental control system, are useful for communication, sensing and control between various components of the system.

Figure 1:
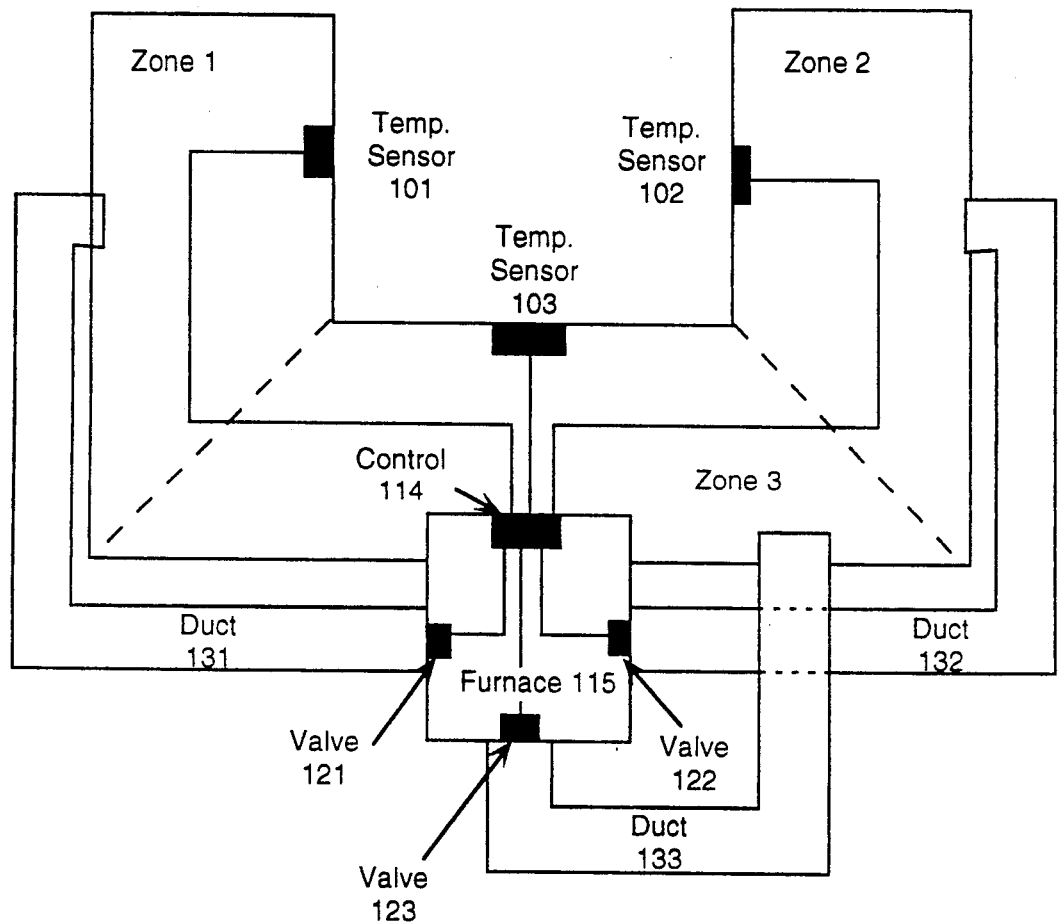
FIG. 1 is an illustration of a typical arrangement of a network for communication, sensing and control as may be implemented utilizing techniques, methods, and apparatus of the present invention.

Referring briefly to FIG. 1, the exemplary network of the present invention is illustrated. The exemplary network provides for sensing, communicating and control of a central heating system which is responsible for regulation of temperatures in 3 zones, Zone 1, Zone 2 and Zone 3, in a controlled environment. Each of the zones (Zone 1, Zone 2 and Zone 3) includes a temperature sensor (temperature sensors 101, 102 and 103, respectively) for sensing temperature information. The temperature sensors 101-103 are coupled to communicate information to control node 114. Control node 114 is further coupled to control valves 121, 122 and 123 which in turn provide heated air from furnace 115 to Zones 1, 2 and 3 respectively.

Of course, many other applications and configurations are within the scope of the teachings of the present invention and the network described with reference to FIG. 1 is merely exemplary.

As can be appreciated, the network of the preferred embodiment in a typical configuration transmits information packets of a relatively short frame size. For example, the information packet may transmit identifying information identifying the packet as being from temperature sensor 101 and temperature information which may comprise only several bits of information.

The nodes are preferably organized into a hierarchy, the particular configuration of which is dependent on the communication needs of the network.

The network of the preferred embodiment follows a traditional layered approach and comprises the layers identified below in Table III:

TABLE III

| APPLICATION LAYER |
|---|
| APPLICATION |
| Application specific RPC, etc.   Network Management |

| TRANSPORT AND SESSION LAYER | | |
|---|---|---|
| | AUTHENTI- | |
| SESSION LAYER | CATION | TRANSPORT LAYER |
| Request/Response Protocol | SERVER | Reliable multicast and unicast |

| TRANSACTION CONTROL LAYER |
|---|
| Common ordering and duplicate detection |

| NETWORK LAYER |
|---|
| Connection-less, domain-wide broadcast, no segmentation, |

TABLE III-continued

| loop-free topology, learning routers |
|---|

| LINK LAYER |
|---|
| Framing, CRC error checking |

| MAC LAYER |
|---|
| Predictive TSMA: collision avoidance |

| PHYSICAL LAYER |
|---|
| Multi-media, media-specific protocols |

The Application layer provides for network management features and application specific remote procedure calls (RPC).

The protocol of the present invention is characterized by combined Transport and Session layers including a Transaction Control layer which handles transaction ordering and duplicate detection for both the Transport and Session layers. The Transport layer provides for connection-less, reliable delivery to both single and multiple destinations. The Session layer implements a request-response mechanism for access to remote servers and allows application-specific remote procedure calls to be implemented. Further details on the combined Transport layer will be discussed below.

The Network layer is responsible for packet delivery within a single domain. The Network layer is characterized as being connection-less, unreliable and does not support either segmentation or re-assembly of messages. Routing algorithms employed by the Network layer of the preferred embodiment assume a tree-like, network topology.

The Link layer provides for subnet-wide, ordered, unreliable message delivery with error detection. However the preferred embodiment of the present invention does not provide for error recovery. In the preferred embodiment, a corrupted data frame is discarded by the Link layer when it fails the cyclical redundancy check (CRC). No attempt is made to re-transmit discarded data frames.

The MAC layer utilizes a collision avoidance scheme with certain similarities to prior art p-persistent carrier sense multiple access (CSMA) protocols. In particular, the preferred embodiment of the present invention utilizes a predictive carrier sense multiple access (CSMA) collision avoidance technique.

The network of the present invention is primarily intended for transmission of message packets of relatively short length. Therefore, it is desired to minimize delays in accessing the network. However, to the extent possible, the persistent CSMA technique of the preferred embodiment attempts to achieve the dual goals of minimizing such delays while avoiding, as practical, collisions on the communication medium.

As will be seen, the predictive CSMA protocol of the present invention discloses a novel scheme for media access allowing for prioritization of messages and collision avoidance. Thus, this scheme assists in the attempt to acheive the above-discussed dual goals. The predictive CSMA technique of the present invention will be described in greater detail below.

The preferred embodiment of the present invention is designed to interface with any of a number of physical media. For example, the network of the present invention may interface with various media such as power lines, twisted pair, radio frequency, infrared, ultrasonic, optical, coaxial, or other media to form a network.

As will be explained in greater detail below, the system of the preferred embodiment allows networking of a plurality of nodes. Each node is uniquely identified by a node identification number (Node_ID). The Node_ID is assigned to the node at the time of manufacture. As one aspect of the present invention, it is desirable that the Node_ID uniquely identifies the particular node from all other cells. Thus, provision is made in the manufacturing plans for the nodes of the preferred embodiment to provide for a unique Node_ID assignment for each node manufactured.

In the preferred embodiment, the Node_ID is a 48-bit value which allows for up to $2^{48}$ unique Node_IDs; it is thought that the use of a 48-bit value provides for a sufficient number of Node_IDs to allow for ensuring availability of unique Node_IDs for the foreseeable requirements. However, it will be obvious to one of ordinary skill that in alternative embodiments alternative number of bits may be utilized. For example, in certain embodiments it may be beneficial to utilize a lesser number of bits to gain certain processing efficiencies. In other embodiments, it may be useful to use a greater number of bits to allow for additional unique Node_ID numbers.

The present invention further discloses unique means for installation and maintenance of the network. Specifically, the present invention discloses means for causing a node to broadcast identification information. Further, the present invention discloses means for allowing installation of configuration and network parameters into a node. Finally, the present invention discloses means for indicating the current condition of a node. The above-mentioned means for installation and maintenance of the network will be discussed in greater detail below.

Definitions

The following definitions are applicable to terms used in this specification:

Cell, neuron, or node: A cell, neuron or node is an intelligent, programmable element or elements providing remote control, sensing, and/or communications, that when interconnected with other like elements forms a communications, control and/or sensing network. As stated above, cells are described in greater detail with reference to U.S. Pat. No. 4,918,690 Markkula et al. titled "Network and intelligent cell for providing sensing, bi-directional communications and control." As will be described, cells are named with node_ids. Also, as will be described, nodes may be addressed as a part of a domain and subnet using a node number. The node number in the preferred embodiment is 7 bits. Finally, multiple nodes may be addressed using a group id. The group id in the preferred embodiment is 8 bits.

Node id: As previously discussed, cells in the present invention are assigned a unique identification number at the time of manufacture. Again, the identification is preferably 48-bits long. This 48-bit identification number does not change during the lifetime of cell. As is appreciated, the assignment of a unique identification to each individual cell allows for numerous advantages. This 48-bit identification number is referred to herein as the node_id or cell id.

Domain addresses: The term "domain" is used to describe a virtual network wherein all communication, as supported by the network of the present invention, must be within a single domain. Any required inter-domain communication must be facilitated by application level gateways.

In the preferred embodiment, domains are identified with 48-bit domain identifiers. However, in certain applications the size of the domain field may vary as will be described in greater detail below.

Subnet—In the preferred embodiment, a subnet is a subset of a domain containing from 0 to 127 nodes. In the preferred embodiment, subnets are identified with an 8-bit subnet identification number. A single domain may contain up to 255 subnets.

Announcer: An announcer is a source of messages. (An announcer in certain cases may request state information from a listener). In the accompanying figures, the letter "A" will be used to designate an announcer cell.

Listener: A listener is a sink of group messages. In the accompanying figures, the letter "L" will be used to designate a listener cell.

Figure 2:
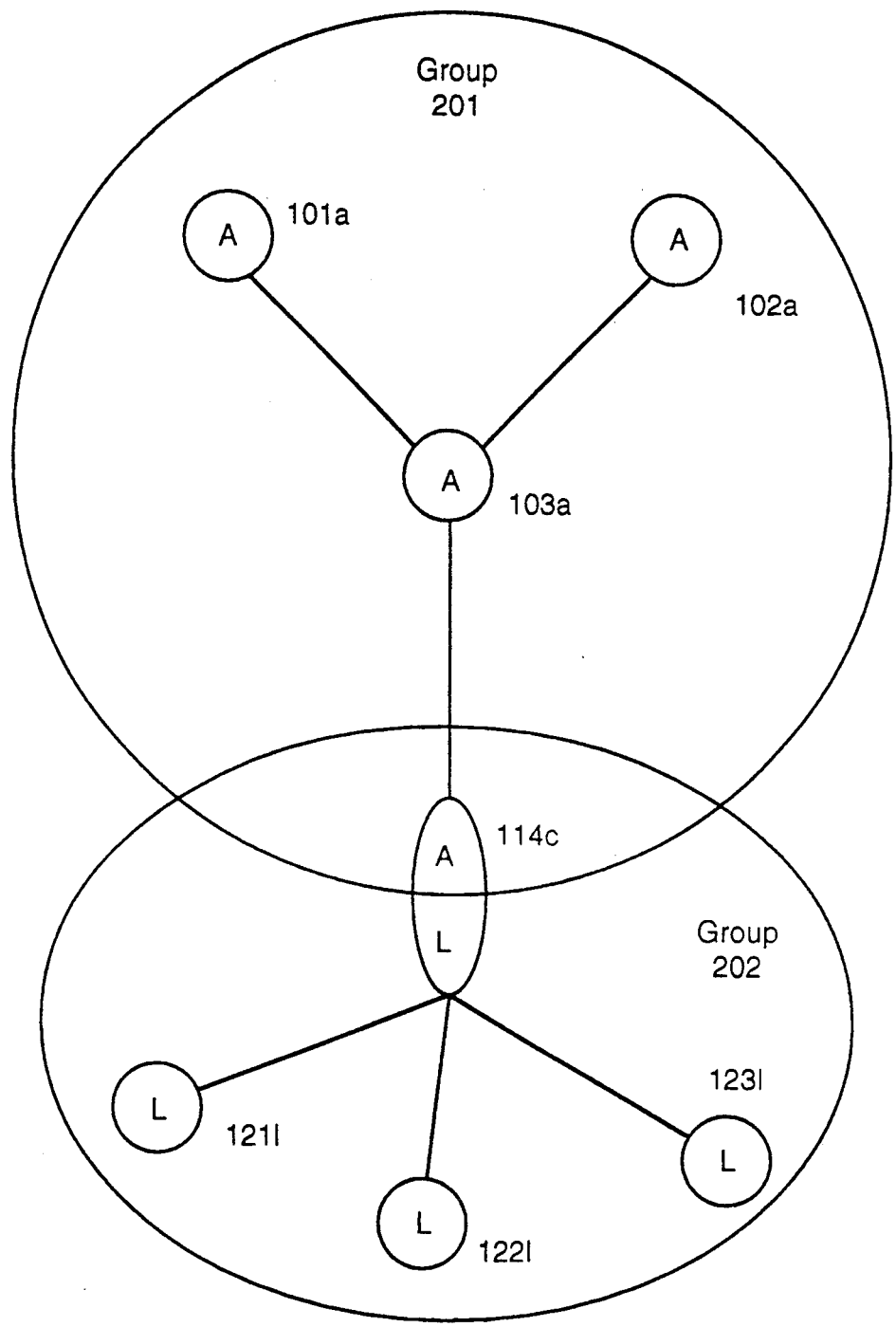
FIG. 2 is a diagrammatic illustration of a typical network for communication, sensing and control as may be implemented utilizing techniques, methods and apparatus of the present invention.

Group: A group is a set of cells which work together to perform a common function. An example of grouping may be appreciated with reference to FIG. 2. FIG. 2 may be thought to illustrate diagrammatically the cells of the network of FIG. 1. Cells located at valves 121, 122 and 123 may be examples of listener cells and may correspond to listener cells 1211, 1221 and 1231, respectively, of FIG. 2. The cells located at valves 121, 122 and 123 listen for commands to control the valves, thus controlling the temperature in zones 1, 2, and 3, respectively. Cells located at temperature sensors 101, 102 and 103 may be thought to correspond to announcer cells 101a, 102a and 103a. The cells located at temperature sensors 101, 102 and 103 announce temperature information corresponding to the then current temperatures of zones 1, 2 and 3. A cell located at control 114 may be thought to correspond to cell 114c of FIG. 2 and provides the function of listening to messages from announcers 101a, 102a and 103a, the function of analyzing temperature information from these messages and the function of announcing messages to cells 1211, 1221 and 1231.

In the preferred embodiment, groups are identified with an 8-bit group identification number. A single domain may contain up to 255 groups.

Naming and addressing

The present invention provides for a hierarchical address structure and supports three basic address types:

1. (Domain, Subnet, Node number);
2. (Domain, Subnet, Node_id); and
3. (Domain, Group).

Network Set-up and Node Identification

Prior to network set-up, a node has no address assigned apart from its 48-bit node_id (the Node_id of address type 2, above). Address types 1 and 3 (above) may be assigned to a node through appropriate requests on the network. For example, a request "Query_ID ( )" is provided to cause a node or set of nodes to provide their 48-bit node_ids. A request "Join_Domain ( )" is provided in the system of the preferred embodiment to cause a node to a join a given domain. A request "Join_Group" is provided to cause a node to become a member of a group.

A node may be assigned multiple addresses. In addition to its node_id, a node in the network of the preferred embodiment is typically assigned one address of address type 1 (domain, subnet, node) and zero or more addresses of address type 3 (domain, group). Nodes may belong to multiple domains and, thus, may have multiple sets of addresses—one for each domain.

SERVICE PIN

As one aspect of the present invention and in one embodiment, a service pin is provided at each node.

The service pin may be used during system configuration to allow a system installer to have access to the unique 48-bit node_id of the node and the node type. (Node type data is implementation dependent and may be as simple as a single data item. For more complex nodes, it can include information about the nodes operation and even configuration information. The node type information, for example the information on how to configure the node, can be displayed on a hand-held installation device which will be discussed in greater detail below.) Further, in alternative embodiments, the service pin may allow the system installer to have access to other information such as the node's network address information (e.g., address type 1, address type 2 or address type 3), and application specific location code information.

As has been discussed, in the preferred embodiment, the node_id is assigned at the time of manufacture of the node. In the preferred embodiment, the node type is also configured by the manufacturer at the time of manufacture of the particular node. The location code is assigned by the system installer. The location code may, for example, assign the node to a particular group and/or subnet.

The service pin may also be used to allow the system installer to configure and re-configure the node with configuration and network parameters (such as the location code).

Figure 3A:
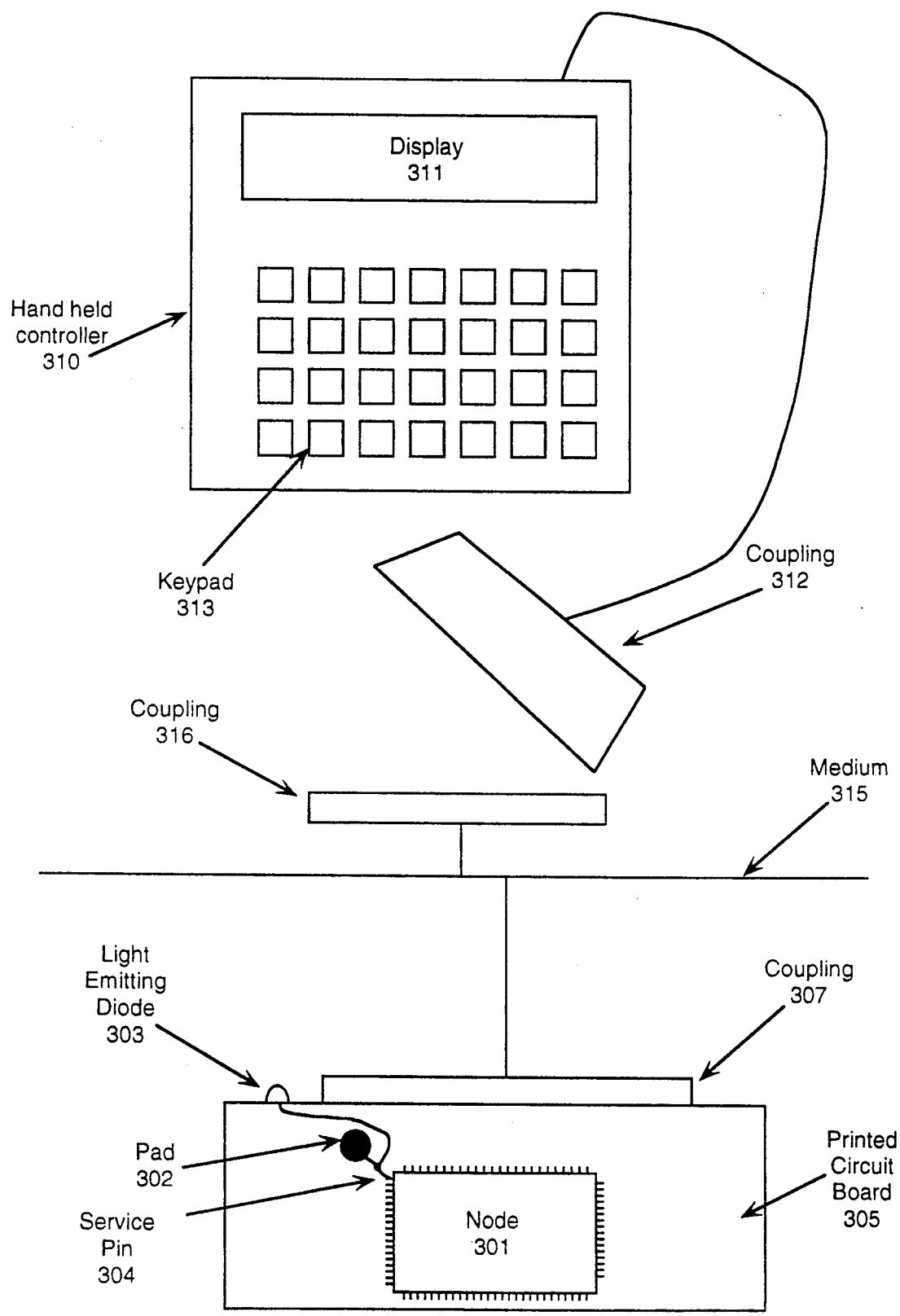
FIG. 3A is an illustration of a node of the present invention and a controller for configuring such a node as may be utilized by the present invention.

In the preferred embodiment, a hand held controller 310 (FIG. 3A) is used by the system installer to configure and poll nodes in a network. The hand held controller 310 includes a coupling 312 which may be coupled in communication with the node 301. For example, as illustrated the coupling 312 is coupled to communication medium 315 through coupling 316. Of course, the controller 310 may be coupled through any number of coupling means including connectors, such as a RJ-11 or similar connector, through RF or microwave communication, or other similar means.

The controller 310 further preferably includes a display 311 for displaying information, such as the node_id, and an input means, such as keypad 313, for inputting information, e.g., location codes. Finally, the controller 310 includes data storage means for storing configuration information. The storage means may be any of a number of types of data storage technology. For example, the storage means may be random access memory, magnetic recording media such as a disk or tape or optical recording media. As will be seen, the installer may request the node to transmit its node_id and node type. The installer may then assign a location code to the node. The nodes' node_id, node type and location code may then be stored in a table of the storage means. After assigning location code information to each node in the subnet, the installer may couple the controller to a central computer to transmit the stored configuration information so that the information may be used in further configuration of the network.

As one alternative to the above-described system of storing information on the controller 310 for later transmission to the central computer, a communications link (such as RF) may be established between the controller 310 and the central computer. The configuration information may then be directly communicated between the controller 310 and central computer without need for intermediate storage.

In any event, after the installer has coupled the controller 310 in communication with the node, the installer may request the node to transmit its node_id and node type data. As will be seen, this request for transmission of information is preferably accomplished with use of a service pin associated with each node in the network. After the hand held controller 310 receives the node_id and node type information, the installer may transmit over the coupling between the node and the controller location code and other information. Of course, the controller 310 may be programmed to automatically assign a location code and communicate the location code to the node upon receipt of the node_id and node type information. In any event, what is important is the ability to provide for accurate and relatively simple configuration of a network through easy access to node identifying information. After assigning a location code and communicating other information, the installer may move on to configure the next node in the subnet.

In the presently preferred embodiment, the node 301 is likewise coupled to the medium 315 through a coupling 307. Coupling 307 and the node 301 are both coupled with a printed circuit board 305 in well known manners. It might be noted that the controller may alternatively be coupled with appropriate coupling means directly to the node 301, avoiding communication through communication medium 315.

A pad (or other sensing means) 302 and a light emitting diode "LED" (or other indication means) 303 are coupled with a service pin 304 of the node 301. The service pin 304 is a bi-directional I/O pin which is polled and actuated by code in the read only memory (ROM) of the node 301.

During normal operations, the LED 303 is normally off. When diagnostic code in the ROM detects an error condition in the node, the LED 303 is lit solid. When the node 301 has not yet been configured by an installer, the LED 303 flashes.

The service pin 304 may be grounded by grounding the pad 302. The pad 302 may be grounded by any of a plurality of common devices. For example, the pad 302 may be grounded by actuation by a button, touching the pad with a screw driver blade, etc. When the pad 302 is grounded, the node sends out a message on the network broadcasting its 48-bit node_id and node type. As will be seen with reference to FIG. 3B the preferred embodiment provides for a button to be utilized as pad 302.

Using the above-described circuit, nodes are more readily identified and may be more readily configured. Further, the circuit allows ready identification of nodes in the network which are either malfunctioning or which have not been configured.

Figure 3B:
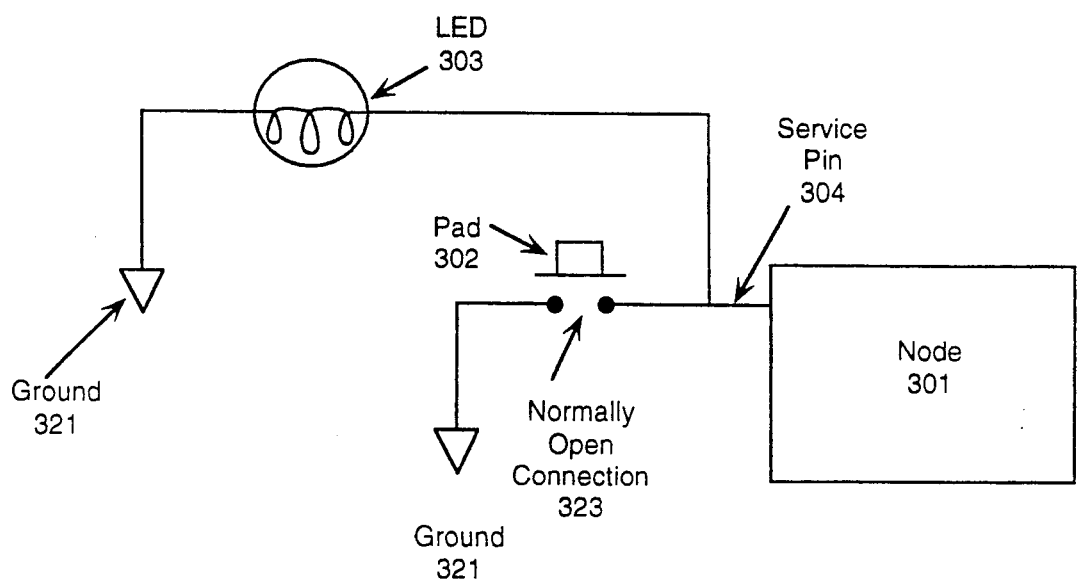
FIG. 3B is a schematic illustration of a service pin/indicator/sensor as may be used by the present invention.

It may now be useful to briefly describe the service pin 304, the pad 302, and LED 303 of the preferred embodiment in greater detail. Such description may be accomplished with reference to FIG. 3B. In FIG. 3B, the node 301 is illustrated including service pin 304 which is coupled to a normally open connection 323 to ground 321. Pad 302, in the form of a pushable button, is provided to close normally open connection 323. As described above, when the normally open connection 323 is closed (and, thus, service pin 304 is grounded), the node 301 is caused to transmit a message onto the medium 315. The service pin 304 is also coupled to provide power to LED 303.

In operation, software executing on the node 301 controls whether the LED 303 is turned on or off by setting or clearing a flag. When the LED 303 is turned off it indicates normal operation; when the LED 303 is turned on it indicates the node is either unconfigured, no application has been loaded, or that some internal failure has been detected. When set, hardware of the node pulses an open-drain output with no more than a 50% duty cycle which sinks 10 mA to drive the LED 303. The node 301 further comprises an on-board pullup that normally pulls the service pin 304 high between active-low LED pulses. When the service pin 304 is forced low by an external connection to ground 321, the hardware detects this event.

THE MAC SUBLAYER

Predictive non-persistent CSMA

As described previously, the MAC sublayer provides for collision avoidance on the transmission medium utilizing a predictive carrier sense multiple access (CSMA) collision avoidance (CA) technique. Briefly, predictive CSMA/CA allows for minimizing channel delays while avoiding, as practical, collisions by delaying access to the media by some random time period P. The time period P is calculated independently by each node wishing to transmit based on an estimated backlog for the system (i.e., for a given node, the time period P will be longer, on average when the backlog is greater).

Figure 4:
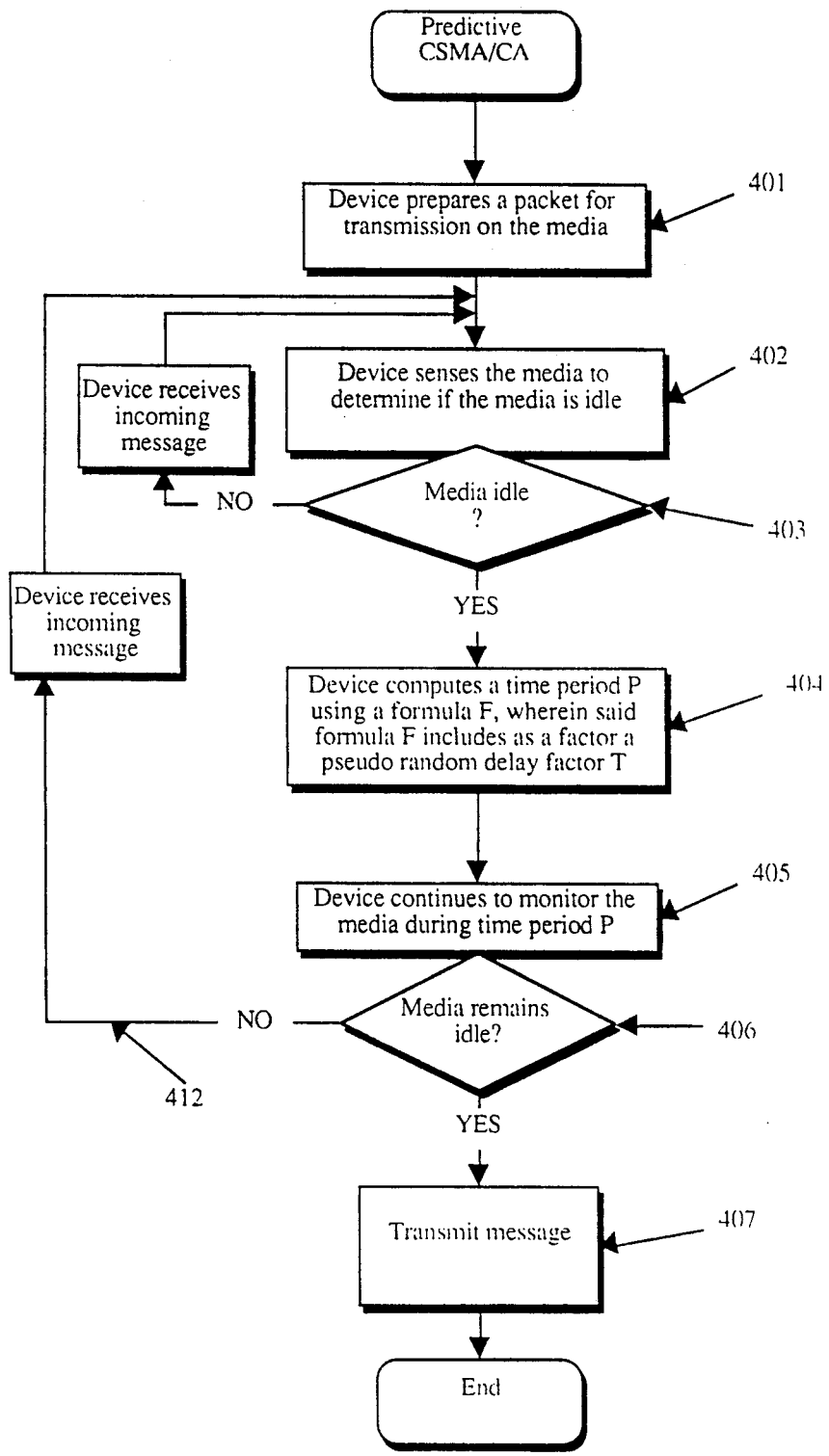
FIG. 4 is a flow diagram illustrating a method utilized by the present invention for accessing a network communication media.

FIG. 4 is a flow diagram illustrating the basic steps for message transmission onto a medium in the network of the present invention.

Packet preparation

Initially, the device prepares a packet for transmission onto the media, block 401. The actual preparation of the packet includes such steps as preparing a header, preparing a checksum, and appending a trailer to the packet. Preparation of the packet is accomplished in the Link layer of the system of the present invention. To the extent necessary, the details of such packet preparation are described herein in greater detail. However, in general, the preparation of a packet for transmission is accomplished in conventional manners and techniques for such preparation will be well known to one of ordinary skill in the art.

Determining the state of the media

After the packet is prepared for transmission, the device senses the media to determine whether the media is idle (i.e., no other devices are currently transmitting), block 402.

Figure 7:
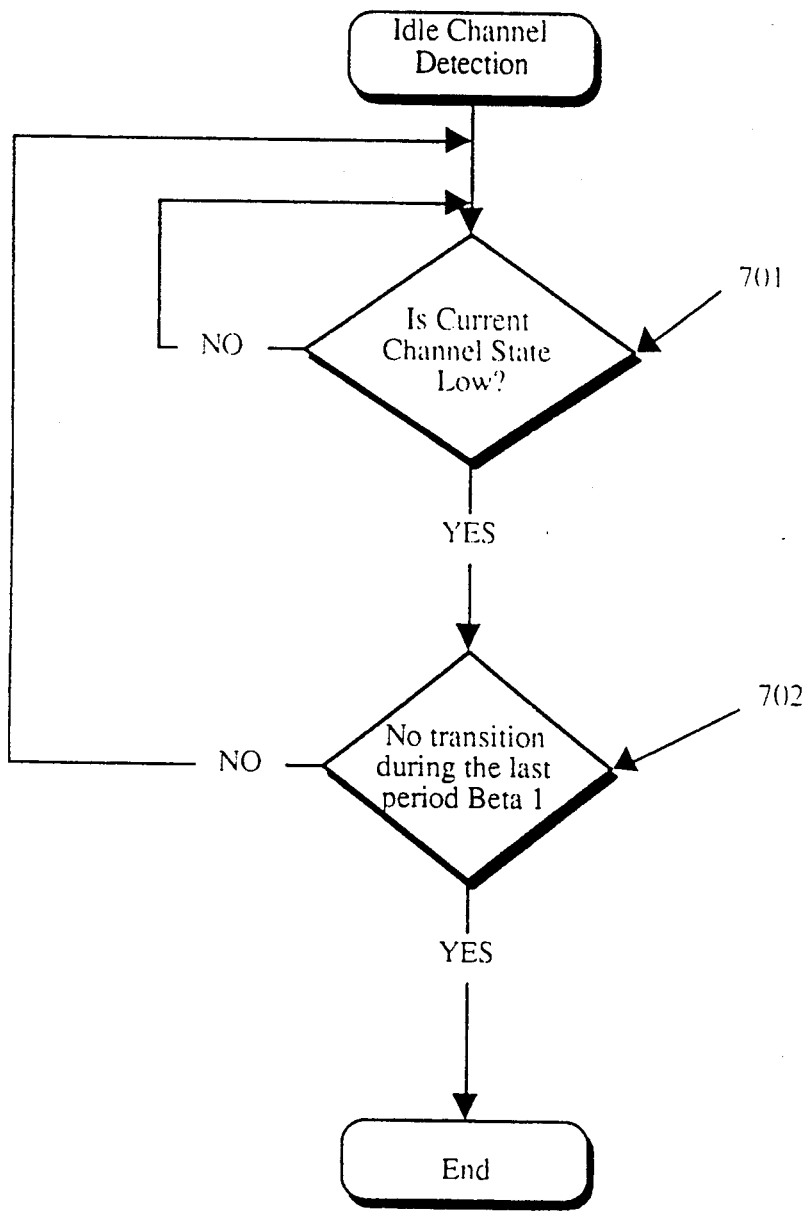
FIG. 7 is a flow diagram illustrating a method of the present invention for detecting the state of a communications channel.

Particular techniques for determining whether the media is idle will vary from implementation to implementation. In fact, as one feature of the present invention, media independence is provided for. The particular media may be, for example, twisted pair wiring, radio frequency (RF), microwave transmission, or power lines. One particular embodiment, wherein the media is twisted pair wiring, is described in greater detail with reference to FIG. 7. Essentially, nodes of this embodiment (and, specifically, the physical layer) monitor the channel to determine the current state of the channel (high or low). If the channel is currently in a low state, block 701, and there has not been a transition in the state of the channel during the last period of time Beta1, block 702, the channel is considered to be idle.

The period of time Beta1 may be defined as:

$$Beta1 > (4*baud\ rate) + (2 * Tau_p) + Tau_m$$

The term (4*baud rate) in the equation for Beta1 of this embodiment accounts for use of 3-of-6 encoding of packets. With use of 3-of-6 encoding, up to four consecutive zeroes may occur within a valid packet. The second term, $(2 * Tau_p) + Tau_m$, accounts for propagation delays and turnaround delays. The term $Tau_p$ is representative of the physical propagation delay defined by the media of the network and by the media length. The term $Tau_m$ accounts for the detection and turnaround delay within the MAC layer and may be better defined as the period from the time the idle channel condition is last confirmed to the time when the first transition appears on the channel.

As one alternative, and in the currently preferred embodiment, differential Manchester encoding is used in place of the preferred 3-of-6 encoding technique. As will be known to one of ordinary skill in the art, differential Manchester encoding provides a self-clocking property to signals transmitted on the channel wherein each bit period is divided into two equal intervals. A binary 1 is sent by having a transistion during a first interval. A binary 0 is sent by having a transistion during a first interval and a second transition during the same interval, at its mid-point. During periods when data is not being transmitted on the media, the voltage remains level (high or low) during both the first and second intervals.

Of course, it will be understood that in an embodiment relying on differential Manchester encoding, the method for detecting an idle channel will differ from the described method employed in a system utilizing 3-of-6 encoding. For example, an idle channel may be defined as any time when there are 1.2 consecutive intervals with no transition in state of the media.

Of course, other media types, such as RF, powerline, and microwave, employ other coding schemes and other methods for detection of an idle condition on the media. The general media access method is the same, for these other media types, as described herein.

Determination of the estimated network backlog (BL)

If the media is determined to be idle, the device computes a random time period P to wait prior to taking any further action with respect to transmission of the packet, block 404.

The time period P is calculated based on an estimated backlog for the network. Thus, as the backlog increases, the average time period P increases (to some finite level as will be seen). Use of estimated backlog information is expected to lead to improved channel utilization.

Figure 6:
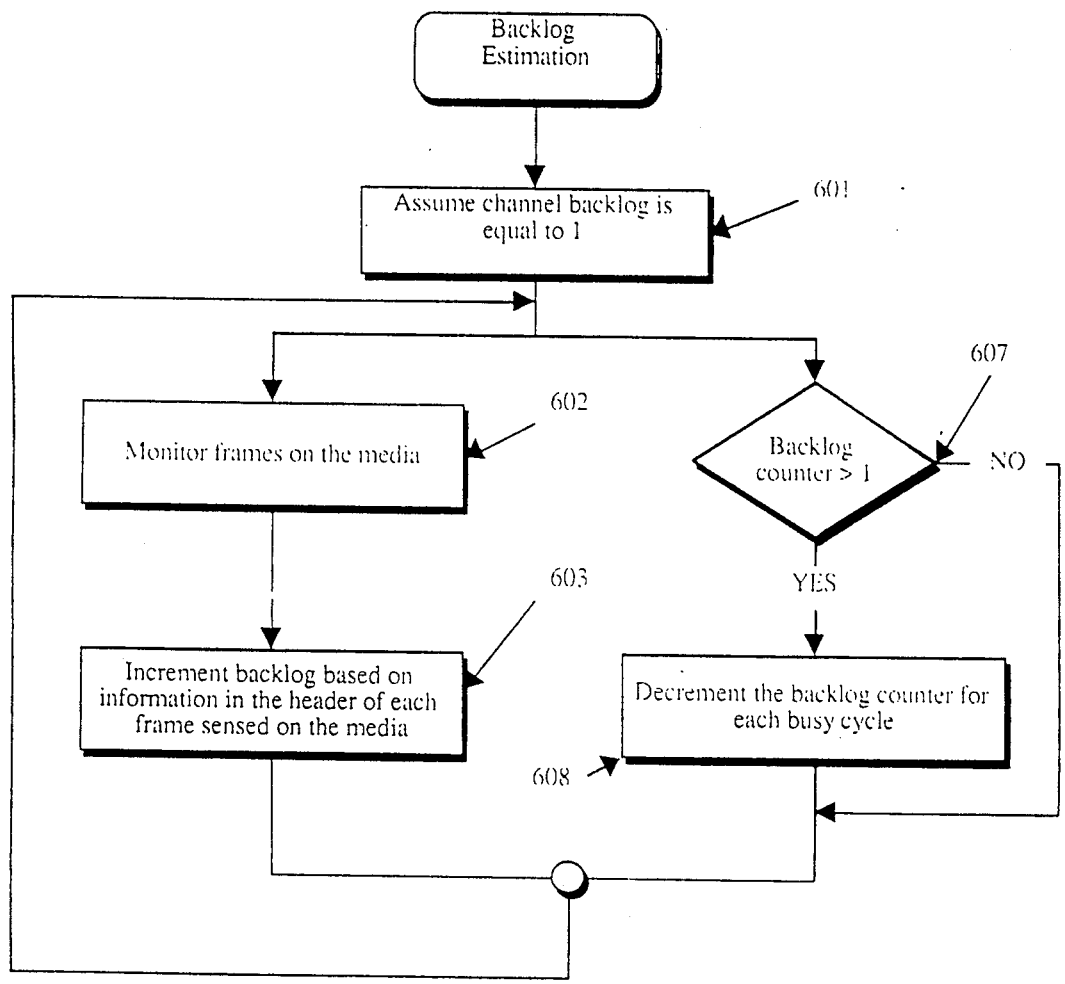
FIG. 6 is a flow diagram illustrating a method utilized by the present invention for backlog estimation.

Computation of the estimated backlog will be better understood with reference to FIG. 6. Initially, the node assumes channel backlog (BL) to be equal to a value of 1, block 601. The node monitors traffic on the channel and looks for new packets being transmitted. Each packet transmitted by nodes in the present invention includes a field N in its header designating the number of packets expected to be generated as a result of the packet (e.g., acknowledgements). For each frame detected, BL is decremented by N. Assuming the backlog counter BL is greater than 1, block 607, BL is decremented by 1 for each busy cycle on the channel. Thus, BL should provide an estimate of total channel backlog. This concept may be expressed as:

$BL = BL = N$ (for each packet detected by the node or sent by the node)

$BL = BL - 1$ (for each busy cycle).

In the preferred embodiment, BL is not incremented when BL exceeds some threshold maximum.

Adjustment of the BL based on network feedback

It is, of course, generally not possible to accurately predict all channel load and, therefore, to precisely predict total channel backlog. Therefore, in certain embodiments of the present invention, it may be desirable to adjust the estimated backlog based on some feedback from the network. Detection of collision on the network, and determining the collision rate is outside of some range may provide such feedback. Alternatively, observing packet spacing on the channel may provide appropriate feedback. In one proposed algorithm mean interpacket spacing of $D_{mean}$ is expected. For each cycle on the channel, $D_{avg}$ is computed as:

$$D_{avg} = (0.5 * D_{avg}) + X$$

where X represents the number of idle slots preceding or following a given packet. BL is adjusted every n-th cycle by incrementing or decrementing BL by K as follows:

If $D_{avg} > (D_{mean} + K)$, then:

$$BL = BL - K$$

If $D_{avg} < (D_{mean} - K)$, then:

$$BL = BL + K$$

The adjustment may be done, for example, every second cycle providing for some smoothing effect as opposed to performing the adjustment every cycle. Doing the adjustment every n-th cycle, where n is greater than 1, allows the effect of a previous adjustment to be seen prior to performing another adjustment. A value of 1 has been proposed in the preferred embodiment for K leading to relatively frequent, but undramatic, adjustments to the estimated channel backlog. Of course, adjustments could be made to $D_{mean}$, K and n to optimize network performance.

Compute a time period P based on backlog BL

As stated above, the time period P is computed based on the estimated backlog for the network. In the preferred embodiment the time period P is generated in the range of:

$$(0 \ldots (w_{base} * BL))$$

where BL is the estimated backlog and $w_{base}$ is a base window size expressed in an integer number of slots. (Slots will be discussed in greater detail below). In the preferred embodiment, $w_{base}$ is 16. The value of BL is taken preferably at time t, where t is the current time. Alternatively, the value of BL may be taken at time t-1.

The particular value for time period P (expressed in an integer number of slots) is generated by taking a random number in the above-expressed range. The use of a random number is expected to yield an improved collision rate as nodes competing for access to the medium will wait differing random periods of time before determining if the media remains idle and beginning a transmission.

Overview of a packet cycle

Figure 5:
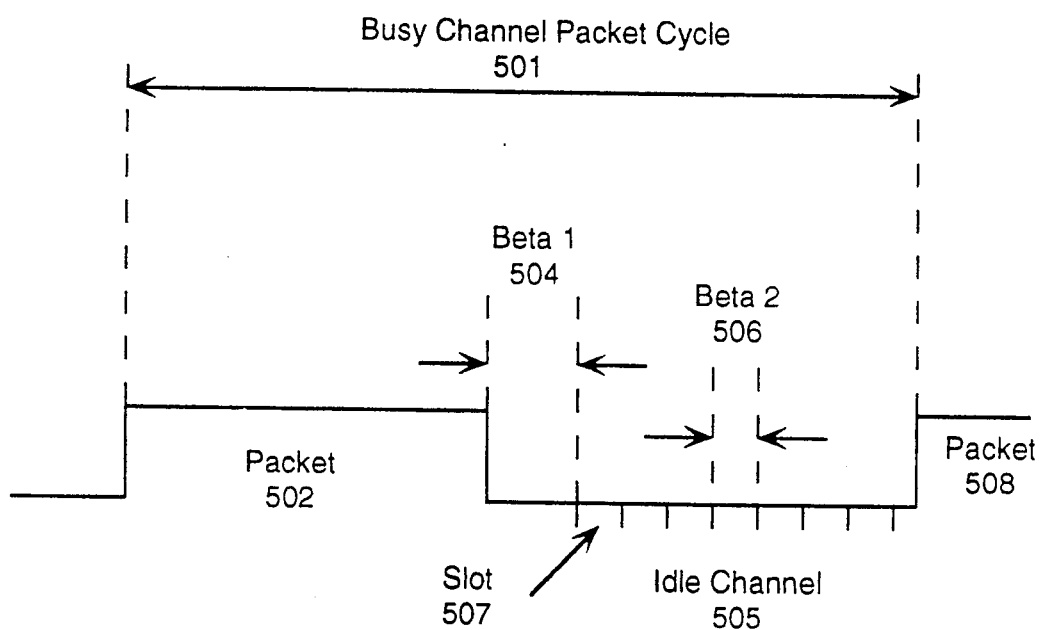
FIG. 5 is an illustration of a typical packet cycle of the present invention illustration a method for accessing the network communication media.

Referring now to FIG. 5, a busy channel packet cycle 501 is illustrated. A first packet 502 is transmitted on the media during a first time period. As is understood from the above description, during the period the first packet 502 is being transmitted, nodes on the network will detect the media is busy and will not transmit other packets. Further, as described above, during period Beta1 504 the channel continues to be detected as busy by the nodes. Of course, period Beta1 504 may varying depending on a number of factors, such as the type of encoding utilized by a particular embodiment.

Any of the plurality of nodes coupled with the media may begin transmitting after detecting idle channel period 505 (i.e., after period Beta1 504). As discussed above, the idle channel period 505 is divided into a plurality of slots, such as slot 507. Each slot is of duration Beta2 506 where Beta2 is defined by the following constraint:

$$Beta2 > (2*Tau_p) + Tau_m$$

where $Tau_p$ and $Tau_m$ were defined above in connection with the description of Beta1.

As is understood with reference to the above description, a node may begin transmission of a second packet 508 after waiting some random number of slots T, the random number of slots being in the described range of:

$$(0 \ldots (w_{base} * BL))$$

and sensing the media to ensure it remains in an idle state.

Of course, other nodes may also be waiting to transmit and may have sensed the medium was idle after period Beta1 504. These other nodes would have also waited some random number of slots. In the case in which the other nodes chose a random number of slots which is greater than the random chosen by the node which began transmission of the second packet 508, such other nodes will sense the medium is busy. These other nodes will receive the packet and the cycle begins again with all nodes sensing the media waiting for the media to become idle (see FIG. 4, branch 412). In the case in which two nodes have chosen the same slot number (and where that slot number is the lowest slot number generated by any node with a packet to send), there will be a collision on the media.

One advantage of determining the number of slots to wait before attempting transmission based on the backlog of the network, where the average number of slots waited is effectively increased as the backlog increases, is that the statistically expected number of such collisions remains constant as channel utilization increases. This is an improvement over 1-persistent CSMA where the collision rate statistically increases rapidly as channel utilization increases. The present inventions allowing the expected number of collisions to remain constant as channel utilization increases is an important feature which allows use of the methods of the present invention even on media where collision detection is not practical, e.g., on RF media.

Prioritization of messages in the preferred embodiment

Figure 8:
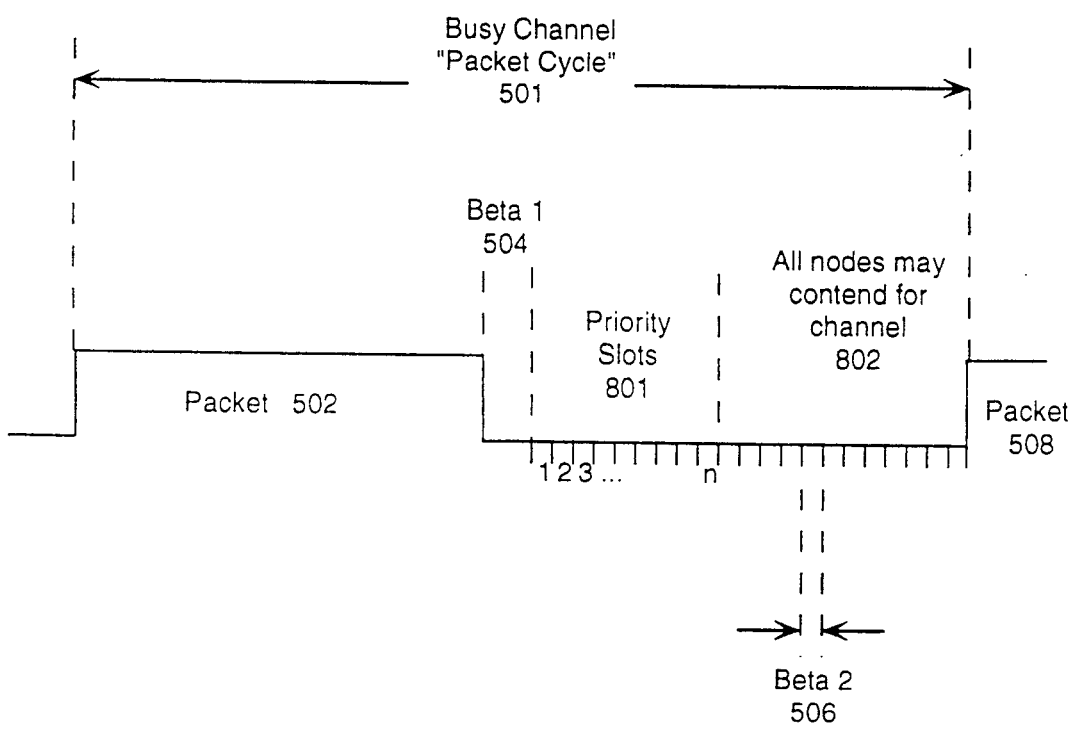
FIG. 8 is an illustration of a typical packet cycle of the present invention illustrating a prioritization scheme as may be utilized by the present invention.

It is appreciated that in certain implementations, it may be desirable to allow for prioritization of messages in the network. A desired prioritization scheme might allow for message priority to be determined either based on message type or on the identity of the transmitting node. The present invention provides for a prioritization scheme which allows for such a feature. The prioritization of messages in the present invention may be better understood with reference to FIG. 8.

In essence, the priority scheme of the preferred embodiment divides the randomizing window into a two portions. Priority messages are transmitted during the first portion (portion 801) and non-priority messages are transmitted during the second portion (portion 802). The first portion is further subdivided into a plurality of randomizing slots (shown as priority slots 1 through n). On a channel-by-channel basis, between 0 and 255 priority slots may be configured in the preferred embodiment. Priority slots are uniquely assigned (during system configuration) to a particular node. Nodes which are assigned a priority slot may use that slot to transmit priority messages. Non-priority messages may be transmitted during period 802 when the node will contend with other nodes in the network for channel bandwidth. A priority bit is set in the header of a message packet which is to be communicated as a priority message.

In the event a node is not assigned a priority slot, a message transmitted by such a node may still have its priority bit set. However, the message will be transmitted onto the original channel during period 802 (with the priority bit set). If the message is later passed onto a different channel through a node having a priority slot assigned to it, the message will then be sent out as a priority message during that priority slot.

It is noted that the protocol of the present invention does not provide for synchronization between nodes. Therefore, if the channel has been idle for a period longer than beta 1 504+period 801 access to the channel is random without regard to priority. After the channel returns to a busy state, access to the channel will again be with regard to priority. As an example, if the channel is idle for a period greater than beta 1 504+period 801, and two nodes then generate messages for transmission, both will generate a random slot number and then wait beta 1 504+their respective random number of slots. The nodes generate and transmit message after the random number of slots regardless of whether the message is a priority message. If the first node generates a lower random number, even if the first node's message is not a priority message and the second node's message is a priority message, the first node's message will be transmitted first. The second node will then attempt to transmit in the normal priority message manner (e.g., during period 801) after completion of transmission of the first message and the beta 1 504 period.

In the event a priority message is generated and sent using reliable messaging, the responding node will attempt to send a priority acknowledgement/response. When priority messages are generated by a node, the priority message is sent out prior to any non-priority messages queued by the node. Multiple priority messages are sent out in FIFO order. However, where the node is already in the process of sending a non-priority message, transmission of that message is preferably completed prior to transmission of the priority message.

It might be noted that in some alternative embodiment, advantages may be gained by aborting the processing transaction in favor of a priority message when a priority message is received by a node. However, it is recognized that this feature may result in either errors in the duplicate detection mechanisms of the system of the preferred embodiment or require additional storage or cause timeouts resulting in reduced response time. This feature has not been implemented in the system of the preferred embodiment.

Using the above-described method, a limited amount of bandwidth is utilized to support priority messaging and collisions are avoided on the channel. However, in the preferred embodiment each slot is only approximately 2 to 3 bits wide; therefore, it is possible to limit the amount of bandwidth wasted to a reasonably small number of bits per second while allowing for a reasonable number of slots to be assigned to nodes expected to transmit priority packets.

Note that if a first node assigned priority slot 1 transmits a message during this slot, a second node assigned priority slot 2 also wishing to transmit a priority message will note that the channel is busy prior to transmitting and will, therefore, not transmit during the current packet cycle avoiding a collision on the medium.

The prioritization technique of the present invention further offers the advantage of allowing for priority to be assigned on a node-by-node basis with the highest priority node being assigned the lowest numbered priority slot. Bandwidth is not used up by nodes which are not expected to transmit priority messages.

As one alternative to the described preferred method of assigning priority, the idle period may be again divided into a priority message portion (801) and a second message period 802. A node wishing to transmit a priority message will attempt to transmit during an assigned priority slot between 1 and n, (portion 801) assuming the media remains idle. Non-priority messages may be transmitted during a randomly determined slot between m and k, where m is equal to n+1 and k is the number of slots in the randomizing period (e.g., during period 802). In this approach n slots are dedicated to priority messages. If there are no priority messages, the n slots are wasted. As one enhancement to this technique, n may be configurable, based on the number of nodes assigned a priority slot, and will vary from installation to installation. In accordance with the teachings of the present invention, k will vary depending on estimated channel backlog. Of course, other embodiments may take advantage of this feature of the present invention without requirement of varying k based on channel backlog. In fact, k, like n, may be configurable in an alternative embodiment.

This embodiment may implement the described alternative prioritization scheme by allowing priority messages to select a random slot number in the range of:

$$(0 \ldots (w_{base}/2))$$

i.e., portion 801 of the randomizing window. Non-priority messages may select a random slot number in the range of:

$$(w_{base}/2 \ldots (w_{base} * BL)).$$

It is appreciated that other schemes may be devised which allow for dividing the randomizing window differently. For example, in the described embodiment, as the estimated channel backlog increases, the size of portion 802 increases relative to portion 801. It may be desirable to implement a prioritization scheme having the opposite result. Of course, many other variations on the allowed range for normal messages v. priority messages may be considered with varying network performance tradeoffs.

Variations in clock frequencies

It is now understood that the present invention allows for communication between a plurality of nodes in a network and that each of the nodes contends for access to a common communication media by attempting to transmit messages only during a particular slot in a window. The size of the window is, at least in part, a function of the clock frequency of the particular node. In the simplest configuration, all nodes run at the same clock frequency and, therefore, the size of the window is held identical, through appropriate circuitry and programming, for each of the nodes. However, networks utilizing the techniques of the present invention may utilize nodes having differing clocking frequencies. For example, certain nodes may be caused to run at relatively slow frequencies because of a desire to save power.

Therefore, as an aspect of the present invention, facility is provided to ensure the window size on each node connected to a given channel is substantially identical. In the presently preferred embodiment, only certain clocking frequencies are supported and the nodes for any given subnet are preprogrammed to support a window size acheivable by all nodes on that subnet. However, in an alternative embodiment, a programmable parameter may be provided which indicates the currently programmed window size. This parameter may be read, for example during system configuration by a hand-held controller, and all nodes on the subnet may have their window sizes scaled to the window size of the slowest node (e.g., scaled by ½, ¼, etc.).

Comparison with prior art techniques

Thus, unlike Aloha techniques, the technique of the present invention waits prior to transmitting until an idle channel is detected.

Unlike 1-persistent CSMA, this technique of the present invention waits a period of time after detecting an idle channel and prior to attempting a transmission.

As may be recalled, in non-persistent CSMA, after a packet is prepared the node senses the channel and if the channel is idle begins to transmit immediately. However, if the channel is busy, the node waits a random period of time, instead of continually monitoring the channel as in 1-persistent CSMA, and repeats the process. Thus, as one distinguishing characteristic between non-persistent CSMA and the technique of the present invention, in the present invention after sensing the channel is idle, the device waits a period of time (where such period of time is based on the estimated channel backlog) before again sensing and then transmitting. In non-persistent CSMA, there is no provision for estimating channel backlog and the device immediately sends a packet if the channel is idle when the packet is prepared.

The technique of the present invention is pehaps most like p-persistent CSMA. In p-persistent CSMA, the node transmits immediately after an idle condition is detected with some probability p. If the node does not transmit immediately, (i.e., with probability q where q=1−p), it waits until a next slot and again transmits with probability p. This process continues until the packet is transmitted. Thus, with p-persistent CSMA, as p approaches zero, the length of time (number of slots) which must be waited approaches infinity. As p approaches one, the collision rate approaches the collision rate found in implementations using the 1-persistent technique. In p-persistent CSMA, the probability p is fixed. In the present invention, the probability of transmission in a given slot is variable based on the predicted backlog of the channel. Use of a variable probability p, based on the backlog of the channel, leads to advantages by providing reduced delay times, over p-persistent methods, in relatively idle networks. In the present invention, the backlog is predictable due to the nature of the network and, especially, the expected number of acknowledgements to messages.

THE TRANSPORT LAYER

As is appreciated with reference to FIG. 1 and FIG. 2, networks utilizing methods of the preferred embodiment may have need to communicate messages either between one node and a single other node (termed "unicast") and between one node and multiple other nodes (termed "multicast"). Further, it is desirable to provide facility which allows both multicast within a group of nodes and multicast to a group of nodes. Finally, it is desired to provide facility for reliable multicast and unicast of messages where the reliable servicing of messages has the following capabilities: (1) reliable delivery of messages wherein a sender may attempt delivery with a specified number of retries and wherein the sender will be aware whether delivery was successful; (2) guaranteed dupicate message detection (except where a receiving node has rebooted since the original message was delivered); (3) preservation of the order of messages where a series of messages are received by a node; and (4) immediate re-synchronization of messages followinga repartition of the network.

In addition, it is desired to develop a network which allows for optional unreliable delivery of multicast and unicast messages. The unreliable delivery protocol provides for no message retries and no acknowledgements.

The transport protocol of the present invention provides for the above described reliable and unreliable, multicast and unicast, message delivery.

Figure 9:
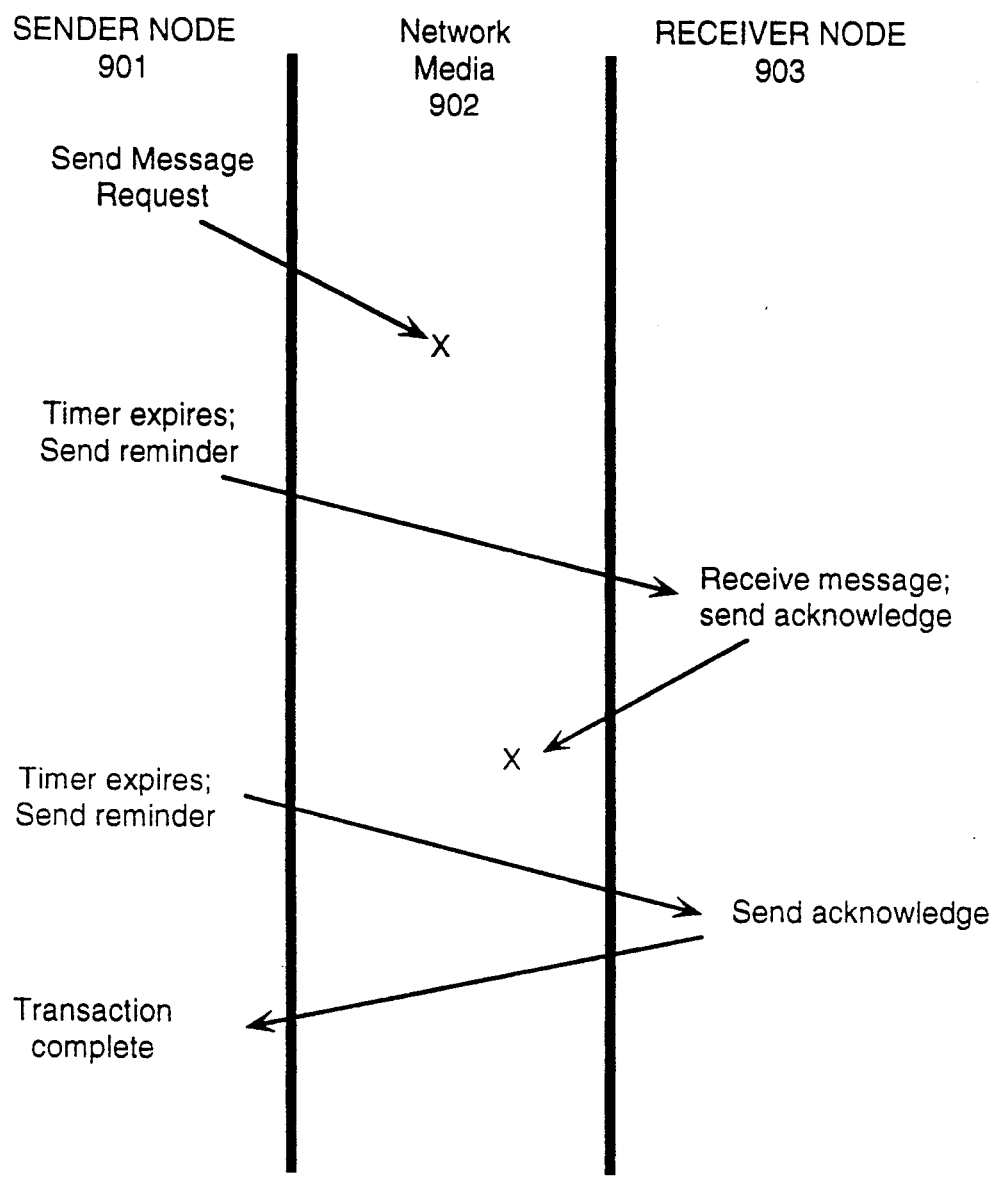
FIG. 9 is an illustration of a typical reliable transaction cycle as may be utilized in communication between nodes using methods of the present invention.

Reliable message delivery of the present invention is better illustrated with reference to FIG. 9. It will be understood that for reasons of simplicity the diagram of FIG. 9 is illustrative of the acknowledgement and retry mechanism between a sending node and a single receiving node and illustrates both loss of a message and loss of an acknowledgement. However, it will be appreciated with an understanding of certain data structures of the present invention that this communication mechanism is applicable to multicast, as well as unicast, message delivery.

The transport protocol of the present invention may be viewed as consisting of two separate and independent functions—send and receive. To support the send function, the transport layer keeps one transmit record for each transaction in process. To support the receive function, a shared pool of receive records is utilized. The transmit records and receive records of the preferred embodiment have the following fields of significance to the present invention:

| TRANSMIT RECORD: | |
|---|---|
| ACK_received: | array [0 . . . 63] of boolean; |
| Dest_count: | 0 . . . 63 {number of destinations} |
| ACK_count: | 0 . . . 63 {count the number of acknowledgements received} |
| Xmit_timer: | timer {timer for timing of retransmissions} |
| Retries_left: | 0 . . . 15 {count of the number of retries left} |

-continued

| | |
|---|---|
| TPDU_pointer: | pointer {to the message being transmitted} |
| RECEIVE Record: | |
| Source: | Unicast or multicast address |
| Trans_no: | 0 ... 15 |
| Rcv_timer | timer |
| State | one of delivered or not delivered |

As is understood with reference to the above-described records, messages may be reliably sent in the preferred embodiment to up to 63 destinations. An array (ACK_received) indicates which of the destinations have acknowledged receipt of the message. The message may be re-transmitted at intervals defined by Xmit_timer up to a number of times set in the counter Retries_left. The ACK_count may be compared with Dest_count to determine if all desired destinations have replied with an appropriate acknowledgement.

When a destination node receives a message, an acknowledgement is sent to the source node and a receive record is activated by setting the Source field to the address of the source node, the Trans_no to a transaction number associated with the message, and the state to undelivered.

Figures 10A, 10B:

Message types used by messages in the preferred embodiment are described in greater detail with reference to FIGS. 10A through 10D. FIG. 10A describes the message format used by reliable and unreliable messages. FIG. 10B describes a first message format used for reminder messages and FIG. 10C describes a second message format used for reminder message. FIG. 10D is the message format for acknowledgements. These formats will be described in greater detail below.

The remainder of the procedure of the preferred embodiment will be understood with reference to FIG. 9 and the procedures set forth in Table IV, illustrating aspects of the send algorithm and Table V, illustrating aspects of the receive algorithm.

TABLE IV

| | |
|---|---|
| Inputs: | |
| Send Message () | service request |
| TPDU In | ACK TPDU from the Network layer |
| Xmit Timer Expiry | timeout of the retransmission timer |
| Outputs: | |
| Trans Completed () | transaction completion indication to the Application layer |
| Uses: | |
| DR | destination record for the desired destination |
| XR | transmit record for this transaction | begin {algorithm}
Case event of
  Send Msg (Address, APDU, priority) → (TID):
  begin Make New Trans (addr)→ (Trans No) request to
  the TC sublayer;
  Allocate and initialize transmit record XR;
  { XR.Dest Count :=(if addr type = unicast then
  1 else grpsize − 1)}
  Create MSG TPDU;
  Make Send Pkt(..., TPDU) request to the Network layer;
  if Service Requested = reliable
    then Start Xmit Timer
    else provide Trans Completed (TID) indication;
end;
ACK TPDU Received:
begin
Validate (TPDU.Trans no) → (result);
if result = current
  then begin Retrieve the associated Transmit
  record XR;
  Restart Xmit Timer;
  If XR.ACK Received [member] = 1
    then exit;

TABLE IV-continued

XR.ACK Received [member] = 1;
XR.ACK Count := XR.ACK Count + 1;
if XR.ACK Count = XR.DestCount
  then Terminate Trans (DR,XR);
end;
end;
Xmit Timer Expiry:
begin
Retrieve transmit record XR;
If XR.Retries Left = 0
  then
    Terminate Trans (DR,XR)
  else begin
    XR.Retries Left:= XR.Retries Left − 1;
    Start Xmit Timer;
    compose reminder message;
    Send the reminder message;
    end;
end;
end case;
Procedure Terminate Trans (DR,XR);
begin
provide Trans Completed () indication to the
Application layer;
Trans Done (Dest Addr, XR.Trans No);
deallocate XR;
end;
end {algorithm};

TABLE V

| | |
|---|---|
| Input: | |
| TPDU in | a TPDU received from the Network layer |
| Timer expiry | of Rcv Timer in Receive Record |
| Outputs: | |
| ACK TPDU | to the remote Transport entity |
| Rcv Message () | indication to the Application layer |
| State Variables | |
| RR pool | pool of Receive Records | begin{algorithm 8.8};
case event of:
  TPDU In:
    Process TPDU;
  Rcv Timer Expiry (RR):
    Deallocate receive record RR;
end case;
Procedure Process TPDU (TPDU in);
  var result: integer;
begin
Retrieve the associated RR (RR = nil if none exists);
if RR ≠ nil then begin
  Reset Rcv Timer;
  Compare (RR.Trans No, TPDU in.Trans
  No) → (result);
  end
else begin
  Allocate and initialize a RR by assigning:
    RR.Source := TPDU in.src addr;
    RR. Trans No := PDU in.Trans No;
    RR.L4 State := not delivered;
  result := new;
  end;
case TPDU in.TPDUtype of
  MSG, uMSG:
    if RR.L4 State = not delivered then begin
    provide Rcv Message () indication to the
    Application layer;
    if TPDU type ≠ uMSG then
      Compose and send ACK TPDU;
    RR.L4 State := delivered;
    end;
  MSG/REM (type 1 or type 2):
  begin
  if (RR.L4 state = not delivered) and
  (type = type2) then begin
    provide Rcv Message () indication to the
    Application layer;
  if TPDUtype ≠ uMSG then
    Compose and send ACK TPDU; RR.L4
    State := delivered;
end TABLE V-continued

```
        else if (RR.L4 state = delivered) then begin
            identify my member no in the destination group,
            1 if unicast;
            if (TPDU in.M List [my member no] = O)
            or(TPDU in.Lsize = O) then
                compose and send ACK TPDU;
            end;
        end;
    end case;
end procedure
end {algorithm};
```

FIG. 9 illustrates how a message may be sent across a network media 902 by a sender node 901. The message preferably follows the format illustrated by FIG. 10(A-)—i.e., the message includes a transaction type field 1001 designating the message as a reliable (MSG) or unreliable (uMSG) type; a transaction number 1002 (trans_no); and the message 1003 itself. In the illustrated example, the message may be lost in the media due to, for example, a collision. Therefore, the receiver node 903 will not receive the message.

At the expiration of a timer, the sender node 901 sends a reminder message (assuming this to a reliable message transaction; in unreliable message transactions no reminder messages are sent) to receiver node 903.

The reminder message follows one of two formats illustrated by FIGS. 10B and 10C, respectively. Before detailing the format of the reminder messages, it is important to conceptually understand reminders in the system of the preferred embodiment. In the preferred embodiment, the node transmitting reminder messages transmits information identifying which nodes have responded to a message. All nodes will receive the message and nodes which are identified as having responded to the message ignore the reminder. The node transmitting the reminder message sets a bit in the member list, 1005 of FIG. 10B and FIG. 10C, corresponding to each node from which an acknowledgement has been received (i.e., each node is identified by a member number in the group with the system of the preferred embodiment allowing group sizes of up to 64 nodes for reliable services). FIG. 10B illustrates the reminder message format for messages in which the highest numbered responding node is member number 16 or higher. FIG. 10C illustrates the reminder message format for messages in which the highest numbered responding node member number is 15 or less. In both cases, the messages include a type field 1001 designating the messages as reminder messages (reminder type 1 for reminders where the highest numbered responding node is member number 16 or higher and reminder type 2 where the highest numbered responding node is member number 15 or less); a transaction number field 1002; and a member list 1005.

In the case of the message format shown in FIG. 10B, space is provided in the format to provide up to 64 bits corresponding with the up to 64 members of the group. In practice, the member list is allocated in bytes and only the number of bytes required to identify all responding nodes are allocated. If, for example, the highest numbered responding node is number 23, three bytes are allocated; if the highest numbered responding node is 31, four bytes are allocated; and if the highest numbered responding node is 32, four bytes are allocated.

In the format of FIG. 10C, only two bytes are allocated for the message list 1005 and, therefore, this format may only be used if the highest numbered responding node is number 16 or lower.

In the case of either the format of FIG. 10B or the format of FIG. 10C, a bit is set to 0 if no acknowledgement has been received from the member corresponding to that bit and the bit is set to 1 if that member's acknowledgement has been received.

In addition to the previously discussed fields, the reminder type 1 messages include transmitting the message 1003 as part of the reminder message.

In the illustrated example, receiver node 903 successfully receives the reminder message and notes its bits in the member list is set to 0 indicating a response has not yet been received by the sender node 901. Therefore, the receiver node sends an acknowledgement message onto the media 902. The acknowledgement message preferably follows the format illustrated by FIG. 10D having the type field 1001 set to ACK. The acknowledgement message also includes a member number field 1006 which allows identification by the sending node of the node responding with acknowledgement.

Of course, in each of the above-described message formats other information, such as addressing, control and error detection/correction information is appended to the message information prior to transmission on the media.

Again referring to FIG. 9, the acknowledgement message is illustrated as being unreceived by the sender node 901. Therefore, again the timer expires and a reminder message is sent on the media 902. The receiver node 903 again receives the reminder message and transmits another acknowledgement. The sender node receives the acknowledgement and the transaction is considered complete.

As is appreciated, the above-described reliable messaging scheme allows for management of large numbers of acknowledgements and further allows for reliable messaging to multicast groups where members of the multicast groups may be anywhere in the network rather than being limited to being on the same channel as the sender.

Thus, an improved communication network is described.

What is claimed is:

1. In a network system allowing for communication, sensing and control comprising a plurality of nodes coupled to a medium, said plurality of nodes comprising at least one group of nodes which may be referred to herein as Group 1, a method for reliably communicating with members of said Group 1 comprising the steps of:
   a) a first device preparing a first message packet for transmission on said medium, said first message packet addressed to members of said Group 1;
   b) said first device transmitting said first message on said medium;
   c) said first message being received by a first member of said Group 1, said first member of said Group 1 referred to herein as Member 1;
   d) said first device setting a timer;
   e) if said timer expires prior to said first device receiving a first acknowledgement of receipt of said first message on said medium, then said first device transmitting a reminder message of a format different than said first message for transmission at least to said Member 1, said Member 1 receiving said reminder message;

f) said Member 1 transmitting said first acknowledgement of receipt of said first message on said medium;
g) said first device receiving said first acknowledgement;
h) said first message being received by a second member of said Group 1, said second member of said Group 1 referred to herein as Member 2;
i) said Member 2 transmitting a second acknowledgement of receipt of said first message on said medium;
j) said first device receiving said second acknowledgement.

2. The method as recited in claim 1 wherein said reminder message includes a field ML comprising information representative of whether said first device has received an acknowledgement from said Member 1.

3. A method for ensuring reliable delivery of messages to a plurality of members of a group, Group 1, in a network comprising the steps of:
  a) a first device transmitting a message packet having a message field for transmission to members of said Group 1, Group 1 including a member M;
  b) said first device waiting a predetermined period of time for an acknowledgement of receipt of said message packet by said member M;
  c) if said first device does not receive said acknowledgement within said predetermined period of time, said first device transmitting a reminder message in a format of a re-transmitted message packet, said format of said re-transmitted message packet including a field F comprising a plurality of subfields, $F_1$ through $F_n$, corresponding to said plurality of members of said Group 1; said subfields for indicating whether an acknowledgement has been received by said first device from said corresponding member of said Group 1, said subfields including a subfield $F_m$ corresponding to said member M;
  d) said format of said re-transmitted message packet further includes a field in which a copy of said message field is enclosed.

4. The method as recited by claim 3 further comprising the step of said member M responding to receipt of said message packet.

5. The method as recited by claim 3 further comprising the step of said member M responding to receipt of said re-transmitted message packet if said subfield $F_m$ indicates an acknowledgement was not received by said first device from said member M.

6. The method as recited by claim 5 wherein said subfield $F_m$ is a bit which is set to a 0 if said first device has not received an acknowledgement from said member M and is set to a 1 if said first device has received an acknowledgement from said member M.

7. The method as recited by claim 3 further comprising the step of said first device computing an expected number of acknowledgement messages to be transmitted responsive to transmission of said message packet, said first device transmitting said expected number as a field of said message packet.

8. A method for ensuring reliable delivery of messages to a plurality of members of a group, Group 1, in a network comprising the steps of:
  a) a first device transmitting a message packet having a message field for transmission to members of said Group 1, Group 1 including a member M, said first device computing an expected number of acknowledgement messages to be transmitted responsive to transmission of said message packet, said first device transmitting said expected number as a field of said message packet;
  b) said first device waiting a predetermined period of time for an acknowledgement of receipt of said message packet by said member M;
  c) if said first device does not receive said acknowledgement within said predetermined period of time, said first device transmitting a reminder message in a format of a re-transmitted message packet, said format of said re-transmitted message packet including a field F comprising a plurality of subfields, $F_1$ through $F_n$, corresponding to said plurality of members of said Group 1; said subfields for indicating whether an acknowledgement has been received by said first device from said corresponding member of said Group 1, said subfields including a subfield $F_m$ corresponding to said member M;
  d) said format of said re-transmitted message packet further includes a field in which a copy of said message field is enclosed;
  e) said member M responding to receipt of said re-transmitted message packet if said subfield $F_m$ indicates an acknowledgement was not received by said first device from said member M.

* * * * *

UNITED STATES PATENT AND TRADEMARK OFFICE
CERTIFICATE OF CORRECTION

PATENT NO. : 5,297,143

DATED : March 22, 1994

INVENTOR(S) : Fridrich et al.

It is certified that error appears in the above-identified patent and that said Letters Patent is hereby corrected as shown below:

In column 20 at line 27 delete "dupicate" and insert --duplicate--

Signed and Sealed this

Eleventh Day of November, 1997

Attest:

BRUCE LEHMAN

Attesting Officer

Commissioner of Patents and Trademarks